Patented Dec. 19, 1950

2,534,447

UNITED STATES PATENT OFFICE 2,534,447

COPOLYMERS OF ISOBUTYLENE AND AN ESTER DERIVED BY ESTERIFYING ABIETYL ALCOHOL AND AN α,β-ETHYLENICALLY UNSATURATED CARBOXYLIC ACID

George E. Hulse, Wilmington, Del., assignor to Hercules Powder Company, Wilmington, Del., a corporation of Delaware No Drawing. Application December 24, 1948, Serial No. 67,248

15 Claims. (Cl. 260—27)

This invention relates to new compositions of matter. More particularly, the invention relates to copolymers of isobutylene and an ester derived by esterifying an abietyl alcohol and an α,β-ethylenically unsaturated carboxylic acid and to a process for the preparation thereof.

It is known to polymerize isobutylene. To effect such polymerization it is customary to employ metallic halide catalysts of the type conventionally employed in Friedel-Crafts-type reactions. Exemplary of such catalysts is anhydrous aluminum chloride. The polymeric materials so produced are normally white, tough, elastic solids which are useful as rubber substitutes. Also known are various abietyl alcohols and the esters and other derivatives of these alcohols. Prior to this invention, however, isobutylene had never been chemically united with the aforementioned abietyl compounds to form a polymeric substance.

Now in accordance with this invention, there have been prepared copolymers of isobutylene and an ester derived by esterifying an abietyl alcohol and an α,β-ethylenically unsaturated carboxylic acid. These copolymers may be prepared by any of the conventional bulk, solution, or emulsion polymerization processes in the presence of peroxide polymerization catalysts. This result is unexpected for the reason that neither such abietyl esters nor isobutylene may be polymerized alone by a peroxide catalyst initiated reaction.

Any α,β-ethylenically unsaturated carboxylic acid may be esterified with an abietyl alcohol to produce an ester from which the new copolymers of this invention may be prepared. Thus, α,β-ethylenically unsaturated polycarboxylic acids such as maleic, fumaric, itaconic, citraconic, etc. acids may be employed, as may be α,β-ethylenically unsaturated monocarboxylic acids such as acrylic, α-methylacrylic, β-methylacrylic, α,β-dimethylacrylic, β,β-dimethylacrylic, β-ethylacrylic, α-hexenoic, etc. acids. Of the rather broad class of acids which are operable, the acids having 5 or less carbon atoms, including the carboxyl carbons, are preferred and particularly preferred are such acids which are also dicarboxylic in nature. Substituted acids may be employed if the substituent or substituents thereof are of such a nature that they are not reactive in the esterification of the acid with an abietyl alcohol or in the subsequent polymerization of the resultant ester with isobutylene, an example of such a nonreactive acid being monochloromaleic acid. When esters of dicarboxylic acids are employed, they may be employed in the form of either mono- or diesters; i. e., either acid or neutral form. Acid anhydrides may, of course, be used as equivalents for the acids themselves in preparing the esters which are intermediates for the products of this invention. The most preferred esters are those derived from maleic acid, maleic anhydride or fumaric acid.

The term "an abietyl alcohol" is employed herein to designate those alcohols which are derived from abietic acid, hydrogenated abietic acid, dehydrogenated abietic acid, or any of the esters, salts or anhydrides of the aforesaid acids. Thus, the term includes abietyl alcohol, dihydroabietyl alcohol, tetrahydroabietyl alcohol, dehydroabietyl alcohol, or mixtures of such alcohols. Any of the procedures known to the art for effecting the hydrogenation of the aforesaid acids or derivatives thereby to yield alcohols may be employed. For example, the sodium reduction of esters of the aforesaid acids according to the well-known general method of Bouveault and Blanc may be employed. See in this connection U. S. 2,021,100, issued November 12, 1935. The abietyl alcohols employed in this invention may also be conveniently prepared by the hydrogenation, in the presence of a hydrogenation catalyst, of the aforesaid acids, their esters, salts or anhydrides according to the methods described in U. S. 2,358,234 and U. S. 2,358,235, issued September 12, 1944. When such catalytic hydrogenation procedures are employed, it is possible to partially or completely saturate the ethylenic double bonds of the acids or their derivatives at the same time that the reduction of the carboxyl group to the alcohol group is being effected if the proper conditions are employed.

Although substantially pure abietic acid or the aforementioned derivatives thereof may be employed in producing the abietyl alcohols used in this invention, it is more desirable from an economic standpoint to employ abietic acid-containing materials such as the various grades of wood or gum rosin available commercially or suitable derivatives thereof as, for example, hydrogenated rosin, dehydrogenated rosin, esters of any of the aforesaid rosins, salts of the aforesaid rosins, or anhydrides of the aforesaid rosins. Thus, it will be understood that for present purposes wood or gum rosin is to be considered as abietic acid; dehydrogenated wood or gum rosin is to be considered as dehydroabietic acid; a hydrogenated wood or gum rosin is to be considered as a hydroabietic acid; esters of wood or gum rosin are to be considered as esters of abietic acid, etc. It will further be understood that any of the natural resin acids other than abietic acid which occur in wood or gum rosin, such acids being l-pimaric acid, d-pimaric acid, sapinic acid, etc., may be used equivalently for abietic acid.

As indicated above, hydrogenated abietic acid or any of the esters, salts or anhydrides thereof may be used in preparing suitable abietyl alcohols for use in this invention. Suitable procedures for hydrogenating the ethylenic double bonds of abietic acid or its derivatives are known to the art as, for example, those disclosed in U. S. 2,094,117 and U. S. 2,155,036. It will be recognized that abietyl alcohol can first be prepared from abietic acid or its esters, salts or its anhydride and the alcohol itself treated with hydrogen to effect the desired degree of hydrogenation of the ethylenic bonds.

Dehydrogenated abietic acid or any of the esters, salts or the anhydride thereof have been stated to be useful in preparing suitable abietyl alcohols for use in accordance with the invention. Suitable procedures for dehydrogenating abietic acid or its derivatives are known to the art. Thus, it is possible to effect substantial dehydrogenation of these compounds by treating the same with an active hydrogenation catalyst under conditions of reaction adapted to produce an intra- and inter-molecular rearrangement of the hydrogen atoms in the resin acid nuclei of the compounds and in the absence of added substances capable of reducing the ethylenic unsaturation of the compounds under the conditions of treatment. See U. S. 2,154,629 in this connection. This treatment is sometimes referred to as disproportionation. Certain types of heat-treatment also effect dehydrogenation of abietic acid and its derivatives. It will again be recognized that abietyl alcohol can first be prepared from abietic acid or its esters, salts or its anhydride and the alcohol itself dehydrogenated to form dehydroabietyl alcohol for use in accordance with this invention.

Having thus described the nature and purpose of this invention, the following examples are offered as illustrative thereof. The "hydroabietyl ester" to which reference is made in Examples I-IV, inclusive, was the di-ester prepared by heating "hydroabietyl alcohol" with a chemically equivalent amount of maleic anhydride at a temperature of about 200° C. for about five hours. No esterification catalyst was employed. The "hydroabietyl alcohol" employed was a commercial product prepared by the hydrogenolysis of the methyl ester of rosin. It contained about 38% tetrahydroabietyl alcohol, about 34% dihydroabietyl alcohol, about 13% dehydroabietyl alcohol, and 15% nonalcoholic materials.

All parts are by weight unless otherwise indicated.

Example I

Hydroabietyl ester was copolymerized with an excess of isobutylene which functioned as a solvent for the monomers. Thus, 125.2 parts of hydroabietyl ester was placed in a glass reaction vessel in the form of a dry powder which had been cooled to a temperature of about −20° C. The hydroabietyl ester was employed in this state to permit ease of handling. To the hydroabietyl ester was added 1.25 parts of benzoyl peroxide and 31.7 parts of isobutylene in the order listed. Approximately 0.5 part of isobutylene was permitted to vaporize and thus sweep the air out of the glass reaction vessel. The reaction vessel was then capped and rotated for 16 hours in a water bath maintained at a temperature of 65° C. At the termination of the 16-hour reaction period, the crude copolymeric product was removed from the reaction vessel and dried in a vacuum at a temperature of about 80° C. for about 14 hours. By this means was obtained 133 g. of a crude hydroabietyl ester-isobutylene copolymer which was characterized by a drop melting point of 135° C.

To a solution of 12.5 parts of this crude product in 50 parts of benzene was added slowly and with agitation 400 parts of acetone. By this means, precipitation of a substantially pure copolymeric material was effected. This precipitate was removed from the benzene-acetone mixture by filtration, washed with 100 parts of acetone and dried. Eight and two-tenths parts of purified product was thus obtained. This purified product was characterized by no apparent drop melting point. However, it softened at a temperature of from 150° C. to about 160° C. and acquired plastic flow properties within the temperature range of from 170° C. to 180° C. No appreciable additional physical change took place in the material as the temperature thereof was raised to 270° C., at which point decomposition began to occur. Even at a temperature of 300° C., however, the product did not melt to form a true liquid but remained a plastic mass.

The intrinsic viscosity of the purified product as determined in benzene was 0.14.

Example II

Hydroabietyl ester and isobutylene were polymerized in the presence of an excess of isobutylene which was utilized as a solvent for the monomers. In this case, 25 parts of isobutylene and 100 parts of hydroabietyl ester were employed. $\alpha,\alpha$-Dimethylbenzyl hydroperoxide was utilized as a catalyst in conjunction with a redox-type polymerization initiating system. Thus, in addition to the isobutylene and hydroabietyl ester, there was included in the polymerization reaction mixture 2.0 parts of $\alpha,\alpha$-dimethylbenzyl hydroperoxide as a catalyst; 0.2 part of ferric acetylacetonate as an oxidizing agent; and 1.0 part of acetylacetone as a reducing agent. In addition to the above ingredients, 2.0 parts of monoamyl amine was added to render the reaction mixture basic in nature. The monoamyl amine, the ferric acetylacetonate, and the acetylacetone were first charged into the reaction vessel. These ingredients were followed in turn by the hydroabietyl ester, the isobutylene, and the $\alpha,\alpha$-dimethylbenzyl hydroperoxide. After all of the ingredients had been added, the reaction vessel was sealed and rotated in a water bath and maintained at a temperature of 65° C. for 3.5 hours.

By this means, 45% of the hydroabietyl ester was copolymerized with isobutlyene after one hour of reaction, while after two hours of reaction, 60% of the hydroabietyl ester was so copolymerized, and after 3.5 hours, 70% of the hydroabietyl ester was copolymerized. The crude product isolated from the final reaction mixture by the process described in Example I was characterized by a drop melting point of 128° C. The crude product was purified by precipitation from an acetone solution as illustrated in Example I. The pure copolymer was found to have a specific viscosity as determined on a 20% benzene solution thereof of 18.6.

Example III

Hydroabietyl ester and isobutylene were copolymerized in the same manner as that described in Example II. In this case, however, benzoin rather than acetylacetone was employed as a reducing agent and the polymerization was effected at a temperature of 40° C. After 0.5 hour of reaction, 70% of the hydroabietyl ester was copolymerized with isobutylene while 75% of the hydroabietyl ester was so copolymerized after three hours of reaction. The final reaction mixture was treated in accordance with the process of Example I to provide a crude copolymer in the form of a hard, clear, brittle resin. The crude copolymer was purified in accordance with the process described in Example I.

This example, as does Example II, demonstrates that hydroabietyl ester and isobutylene can be very rapidly copolymerized by means of a redox-type solution polymerization process.

Example IV

A copolymer was prepared by the emulsion polymerization at 65° C. of hydroabietyl ester and isobutylene. Thus, 70 parts of hydroabietyl ester which had been cooled to a temperature of about −20° C., 30 parts of isobutylene, 3.2 parts of the sodium soap of dehydrogenated rosin as emulsifying agent, 180 parts of water, one part of α,α-dimethylbenzyl hydroperoxide catalyst and a redox polymerization activator consisting of 1.5 parts of sodium pyrophosphate decahydrate, 0.17 part of ferric ion in the form of ferric sulfate nonahydrate, and 0.25 part of fructose were charged into a glass reaction vessel. A very small amount of aqueous sodium hydroxide was added to the mixture of the named ingredients—just sufficient to neutralize the free acidity of the dehydrogenated rosin soap and the hydroabietyl ester. The reaction vessel was then closed and rotated at a temperature of 65° C. After 27 hours of reaction, 70% of the hydroabietyl ester had been copolymerized with isobutylene. About 400 cc. of an aqueous solution of sodium chloride and sulfuric acid were added to the contents of the reaction vessel and the resultant mixture was boiled on a hot plate for a short time. A crude copolymeric product was thus precipitated. (The aqueous acid-salt solution utilized to precipitate the crude polymeric product was prepared by dissolving 63 parts of sodium chloride and 6.5 parts of 10% sulfuric acid in 936 parts of water.) The crude copolymer was then removed from the reaction vessel and dried in a vacuum at 80° C. for about 14 hours. The resulting crude copolymer was a hard, brittle, light-colored resin having a drop melting point of 126° C. It was purified by precipitation from an acetone solution as illustrated in Example I. The pure copolymer was found to have a specific viscosity of 16.0 as determined on a 20% solution thereof in benzene.

The "hydroabietyl ester" to which reference is made in the following Example V was the di-ester prepared by esterifying "hydroabietyl alcohol" with a chemically equivalent amount of fumaric acid. The esterification was carried out at 200° C. to provide an ester having a drop melting point of 55° C. and an acid number of 6.6.

Example V

Seventy-five parts of said hydroabietyl ester was placed in a glass reaction vessel of the type used in Example I in the form of a dry powder which had been cooled to a temperature of about −20° C. To the hydroabietyl ester was added 1.33 parts of benzoyl peroxide and 25 parts of isobutylene. Approximately 0.5 part of isobutylene was permitted to vaporize and thus sweep the air out of the glass reaction vessel. The vessel was then capped and rotated 7.3 hours in a water bath maintained at 65° C. The contents were removed from the reaction vessel and dried in a vacuum at 80° C. for about 14 hours. The resulting crude hydroabietyl ester-isobutylene copolymer was a hard, brittle, light-colored resin similar in appearance to that of Example I. A benzene solution of the crude copolymer was purified by precipitation from acetone in accordance with the method of Example I.

As indicated by the examples, there may be isolated from the reaction mixture in each case a crude copolymer product. Different methods of isolation are employed depending upon whether or not solution or emulsion polymerization has been employed. In any event, the crude copolymer is a composition which is substantially free of monomeric isobutylene. It does, however, contain unreacted abietyl ester and any nonalcoholic material which may have been present in the alcohol used to make the ester. These crude copolymers demonstrate drop melting points which increase as the copolymer content increases. They may be characterized as hard, brittle, light-colored resins. Their drop melting points are usually in the 100–130° C. range.

A substantially pure copolymeric material may be prepared by adding slowly and with agitation to a solution of the crude copolymer in a nonpolar solvent such as benzene, toluene, petroleum ether or the like, a polar material such as acetone or dioxane in which the copolymer is insoluble, thus causing the copolymer to precipitate. It is preferable that the solution from which the copolymer is precipitated contain from about 20% to about 60% by weight of the copolymeric material. The copolymer so precipitated may be removed by filtration, washed with acetone or a similar polar solvent and dried to obtain a purified material.

The pure copolymers are linear copolymers wherein the copolymer unit consists of one molecule of abietyl ester and one molecule of isobutylene. In other words, the pure copolymers are made up of linear chains of abietyl ester molecules and isobutylene molecules in alternating relationship. The structure of these pure copolymers is essentially the same regardless of the method by which they are prepared or of the relative proportions of ingredients utilized. The average molecular weights of these pure copolymers are variable, however, and are dependent on the method of preparation. For example, it is possible to prepare a pure copolymer having an average molecular weight (number average) which evidences an average chain length of fifteen or more copolymer units; i. e., fifteen or more abietyl ester molecules and fifteen or more isobutylene molecules; or it is possible to prepare a pure copolymer having a higher or lower average molecular weight.

From what has been said relative to structure of the copolymers, it will be apparent that an abietyl ester and isobutylene can be employed in equi-molar proportions in making the subject copolymers. For example, in making copolymers from the hydroabietyl ester of Examples I–IV and isobutylene, about 92% by weight of the former and about 8% of the latter may be employed. However, an excess of either monomer may be employed. As has been illustrated by the foregoing examples, in one embodiment of the invention, an excess of isobutylene is employed. In this case, the isobutylene functions both as a reactant and a solvent.

The pure copolymers demonstrate no true melting points but first soften and then acquire plastic flow properties as the temperature is raised. Even at decomposition temperature, the copolymers do not liquefy but remain a plastic mass. The temperatures at which these various phenomena occur, of course, vary with the average molecular weight of the copolymer and also with the specific abietyl ester from which the copolymer is prepared. A copolymer prepared by solution polymerization at 65° C. for 16 hours of the hydroabietyl ester employed in the foregoing Examples I-IV, inclusive, in the presence of an excess of isobutylene as a solvent and of benzoyl peroxide as a catalyst softens at 150–160° C., acquires plastic flow properties at 170–180° C., and begins to decompose at 270° C. Even at 300° C., the copolymer is not truly liquid in nature but remains a plastic mass. However, a copolymer of higher average molecular weight prepared from the same ingredients by emulsion polymerization at 40° C. in a manner similar to that described in Example IV remains a very dry mass which demonstrates no evidence of softening or decomposition when heated to a temperature of 300° C.

Both the crude copolymers and the pure copolymers are hard, light-colored resins. Both of these copolymeric materials are soluble in aromatic hydrocarbon solvents such as benzene, toluene, and xylene; in paraffinic hydrocarbon solvents such as petroleum ether and narrow range gasoline; and in other organic solvents such as butyl acetate and carbon tetrachloride. The copolymers are insoluble, however, in polar solvents such as acetone, methyl acetate, dioxane and the like.

As illustrated by the examples, the copolymers of this invention may be prepared by conventional polymerization processes. A preferred method, however, is in effect a combination bulk and solution polymerization process wherein an excess of isobutylene over that theoretically required to form a copolymer with all of the abietyl ester present is employed as a solvent. This process may be practiced, for example, by charging the particular abietyl ester it is desired to employ together with an excess of isobutylene and a conventional peroxide polymerization catalyst into a reaction vessel and agitating the reaction mixture. The reaction may be carried out over a wide range of temperatures. However, it is preferred that the copolymerization be effected at a temperature within the range of from about 20° C. to about 80° C. when this process is employed.

Although an excess of isobutylene is preferred as a solvent, other nonreactive mutual solvents for the monomers may be employed. Thus, aromatic hydrocarbon solvents, such as benzene, toluene, and xylene or paraffinic hydrocarbon solvents, such as narrow range gasoline may be employed. Likewise, other nonpolar organic solvents, such as carbon tetrachloride may be utilized.

The conventional peroxide polymerization catalysts may be used to effect the solution or bulk polymerization of isobutylene and an ester derived by esterifying an abietyl alcohol and an $\alpha,\beta$-ethylenically unsaturated carboxylic acid. Thus benzoyl peroxide, potassium persulfate, tert-butyl hydroperoxide, ascaridole, lauroyl peroxide and the like may be so utilized. A preferable range of concentration of such peroxide catalysts is from about 0.3% to about 3.0% of the weight of the abietyl ester employed.

If desired, a redox-type polymerization process may be utilized to produce the novel copolymers of this invention and it may be used in a solution system or in an emulsion system. In a redox-type solution polymerization process, the same solvents as those hereinbefore described as useful in the conventional solution polymerization process may be utilized. Thus, an excess of isobutylene is the preferred solvent in the redox-type solution polymerization process, but other organic solvents may be utilized.

Redox systems in general comprise a combination of a heavy metal complex oxidizing agent and an organic reducing agent such as a reducing sugar. These redox systems are so designated because of their inherent property of catalyzing oxidation-reduction reactions. Exemplary of the heavy metal complex oxidizing agents which may be utilized are the pyrophosphates, oxalates, tartrates, citrates, salicylates, acetylacetonates, and similar complexes of such heavy metals as iron, cobalt, nickel, copper, silver, zinc, cadmium, mercury, chromium, manganese, and molybdenum. These heavy metal oxidizing agents are complexes wherein the metallic cation is united with the complexing anion by coordinate covalent bonds rather than by electrovalent bonds.

Organic reducing agents such as α-hydroxy carbonyl compounds or compounds which react as α-hydroxy carbonyl compounds are normally employed in conjunction with these heavy metal complexes. In general, those aldehydes and ketones containing a hydroxyl group on a carbon atom adjacent to the carbonyl group and thereby having in common the structural group

are operable. Illustrative of these compounds are fructose, glucose, lactose, acetylacetone, ascorbic acid, acetoin, propionoin, butyroin, benzoin, pivaloin, and the like.

Also operable are members of that class of polyhydroxy aldehydes and ketones known as reducing sugars. Exemplary of the reducing sugars which may be utilized are the monosaccharides, including aldotrioses such as glycerose; ketotrioses such as dioxyacetone; aldotetroses such as erythrose and threose; ketotetroses such as erythrulose; aldopentoses such as arabinose, xylose, lyxose and ribose; ketopentoses such as araboketose and xyloketose; aldohexoses such as glucose, galactose, mannose, gulose, idose, talose, allose and the like; ketohexoses such as fructose or levulose, sorbose and the like; and other reducing sugars including the disaccharides and trisaccharides such as maltose, lactose and mannotriose. Also operable is the equimolecular mixture of fructose and glucose obtained by the hydrolysis of sucrose and known as invert sugar.

It will be understood that the organic reducing agents mentioned hereinabove, although operable for redox-type emulsion polymerizations, may in certain instances not be operable in redox-type solution polymerizations wherein nonpolar solvents are employed because of low solubility of the reducing agents in such media. The reducing sugars, for example, evidence low solubility in such media.

In the preparation of the copolymers of the subject abietyl esters and isobutylene by a redox-type solution polymerization process, it is preferable that the heavy metal complex constitute an iron derivative. The heavy metal complex oxidizing agent may be employed in an amount equivalent to from about 0.1 to about 10,000 P. P. M. based on the weight of the abietyl ester utilized. A preferable range on this basis is from about 1.0 to about 1000 P. P. M. The preferred range of concentration of the organic reducing agent is from about 0.01% to about 5% of the weight of the abietyl ester.

The utilization of a redox-type solution polymerization process in the preparation of the copolymers of this invention is desirable in that a good yield of copolymeric product is obtained after a shorter period of reaction than is possible in the absence of such a redox system. When the redox solution process is employed, it is preferable that the polymerization be effected at a temperature of from about 10° C. to about 40° C. Somewhat higher or lower temperatures may, however, be employed.

As illustrated by Example IV, the copolymers with which this invention is concerned may also be prepared by emulsion polymerization processes in which a redox system is utilized. In such a process, the monomers are charged into the reaction vessel in conjunction with a relatively large amount of water, a peroxide polymerization catalyst, the heavy metal complex oxidizing agent and organic reducing agent components of the redox system, and an emulsifying agent. Agitation of the reaction mixture creates an emulsion and polymerization of the monomers ensues.

Any emulsifying agent may be employed, for example, the fatty acid soaps, the various rosin soaps, such as the alkali metal salts of hydrogenated or dehydrogenated gum or wood rosin and the hydrogenated or dehydrogenated rosin acids which may be derived therefrom, and the water-soluble salts of the various rosin amines. The emulsifying agents derived from rosin are preferable for the reason that these materials are more compatible with the copolymers of this invention than are, for example, the fatty acid soaps. A preferable range of concentration of emulsifying agent is from about 3% to about 6% of the weight of the abietyl ester utilized.

If the redox-type emulsion polymerization process is used, the same redox system components and the same peroxide polymerization catalysts may be employed in substantially the same proportions as specified for the solution redox polymerization process. It is preferable, however, to effect the emulsion polymerization of the abietyl esters with isobutylene at a temperature of from about 50° C. to about 80° C.

If either the solution or emulsion redox-type polymerization processes are utilized to prepare the novel copolymers of this invention, $\alpha,\alpha$-dialkylarylmethyl hydroperoxides are preferably employed as catalysts although the conventional peroxide polymerization catalysts hereinbefore mentioned may be employed if desired. However, such hydroperoxides function best in the presence of a basic nitrogen compound selected from the group consisting of ammonia, amines, and hydrazines. Accordingly, there should be included in the polymerization reaction mixture a small amount of such compound. If a redox-type solution polymerization process is employed, the basic nitrogen compound is preferably organic in nature. The alkyl amines such as the monoamyl amine mentioned in Examples III and IV are best suited for this purpose. These amines may be employed in an amount equivalent to from about 0.005% to about 5.0% of the weight of the abietyl ester employed. The $\alpha,\alpha$-dialkylarylmethyl hydroperoxides may be employed in an amount equivalent to from about 0.001% to about 5.0% of the weight of the abietyl ester.

The $\alpha,\alpha$-dialkylarylmethyl hydroperoxides may be prepared by the oxidation of alkyl-substituted aromatic organic compounds having the structural formula

in which $R_1$ and $R_2$ represent alkyl groups and Ar represents a substituent selected from the group consisting of aryl and substituted aryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds as a temperature between about 25° C. and about 95° C. in the presence of an aqueous alkali. The concentration of the aqueous alkali may be between about 1% and about 35% although it is preferable to use concentrations of about 2% to about 8%. Vigorous agitation is desirable during the oxidation reaction.

As illustrative of the alkyl-substituted aromatic organic compounds which may be oxidized, p-cymene, cumene, and diisopropylbenzene may be mentioned. These compounds lead to $\alpha,\alpha$-dimethyl-p-methylbenzyl, $\alpha,\alpha$-dimethylbenzyl, and $\alpha,\alpha$-dimethyl-p-isopropylbenzyl hydroperoxides, respectively. Also, in the case of diisopropylbenzene, $\alpha,\alpha,\alpha',\alpha'$-tetramethyl-p-xylylene dihydroperoxide may be formed. These compounds also may be named as aryl (dialkyl)-methyl hydroperoxides; for example, $\alpha,\alpha$-dimethylbenzyl hydroperoxide may be designated as phenyl(dimethyl)methyl hydroperoxide. The aryl and substituted aryl groups need not be derived from benzene, as is the case in the aforementioned compounds, for compounds containing aromatic nuclei derived from napthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, tertiary butyl, and the like, the same alkyl groups also being representative of $R_1$ and $R_2$ in the structural formula. $R_1$ and $R_2$ may be either the same or different.

The crude copolymers may be isolated from any of the above-described polymerization reaction mixtures by conventional methods known to the art. However, when the reaction mixture has resulted from emulsion polymerization, the preferred process entails the precipitation of the copolymers by the addition of an aqueous solution of an inorganic salt and a mineral acid, separating the precipitate by filtration, washing the filtered material with water, and drying the crude product so obtained. A salt solution suitable for precipitation of the crude copolymer may be prepared by dissolving 63 parts of sodium chloride and 6.5 parts of 10% sulfuric acid in 936 parts of water.

The novel copolymers of this invention demonstrate excellent solubility in low cost aliphatic and aromatic hydrocarbon solvents such as benzene, toluene, the xylenes, petroleum ether, narrow range gasoline and the like. These new copolymers are also soluble in such solvents as butyl acetate and carbon tetrachloride, but are insoluble in certain polar solvents such as acetone and dioxane. Hence, these copolymers may be used in the formation of coating compositions and the like. Furthermore, these novel copolymers are compatible with both natural and butadienestyrene copolymer type synthetic rubber and hence may be utilized as compounding ingredients for adhesive compositions. Likewise, the copolymers with which this invention is concerned are compatible with paraffin wax and may be utilized as a paraffin wax modifying agent. In addition, these new resins are useful in heat set printing ink and in chewing gum formulations. These copolymers, therefore, constitute a significant contribution to the synthetic resin art.

It is intended that the expression "ester derived by esterifying an abietyl alcohol with an $\alpha,\beta$-ethylenically unsaturated carboxylic acid" and similar expressions, as used herein and in the appended claims, shall be construed of sufficient breadth to cover not only esters prepared by direct esterification but also those prepared by ester interchange or transesterification, those prepared by reacting the alcohol with an acid chloride of the acid, etc. It will also be understood that wherever the term "acid" appears in this specification and claims the acid anhydride thereof is a true equivalent.

What I claim and desire to protect by Letters Patent is:

1. A copolymer of isobutylene and an ester derived by esterifying an abietyl alcohol with an $\alpha,\beta$-ethylenically unsaturated carboxylic acid, said copolymer being linear in character and containing one molecule of the ester and one molecule of isobutylene per copolymer unit, said abietyl alcohol being a member of the group consisting of abietyl alcohol, dihydroabietyl alcohol, tetrahydroabietyl alcohol, dehydroabietyl alcohol, and mixtures of such alcohols.

2. A copolymer of isobutylene and an ester derived by esterifying an abietyl alcohol with an $\alpha,\beta$-ethylenically unsaturated dicarboxylic acid, said copolymer being linear in character and containing one molecule of the ester and one molecule of isobutylene per copolymer unit, said abietyl alcohol being a member of the group consisting of abietyl alcohol, dihydroabietyl alcohol, tetrahydroabietyl alcohol, dehydroabietyl alcohol, and mixtures of such alcohols.

3. A copolymer of isobutylene and an ester derived by esterifying abietyl alcohol with an $\alpha,\beta$-ethylenically unsaturated dicarboxylic acid, said copolymer being linear in character and containing one molecule of the ester and one molecule of isobutylene per copolymer unit.

4. A copolymer of isobutylene and an ester derived by esterifying abietyl alcohol with maleic acid, said copolymer being linear in character and containing one molecule of the ester and one molecule of isobutylene per copolymer unit.

5. A copolymer of isobutylene and the diester derived by esterifying abietyl alcohol with maleic acid, said copolymer being linear in character and containing one molecule of the ester and one molecule of isobutylene per copolymer unit.

6. A copolymer of isobutylene and an ester derived by esterifying a hydroabietyl alcohol with an $\alpha,\beta$-ethylenically unsaturated carboxylic acid, said copolymer being linear in character and containing one molecule of the ester and one molecule of isobutylene per copolymer unit.

7. A copolymer of isobutylene and an ester derived by esterifying a hydroabietyl alcohol with fumaric acid, said copolymer being linear in character and containing one molecule of the ester and one molecule of isobutylene per copolymer unit.

8. A copolymer of isobutylene and a diester derived by esterifying a hydroabietyl alcohol with fumaric acid, said copolymer being linear in character and containing one molecule of the ester and one molecule of isobutylene per copolymer unit.

9. A copolymer of isobutylene and the diester derived by esterifying dihydroabietyl alcohol with fumaric acid, said copolymer being linear in character and containing one molecule of the ester and one molecule of isobutylene per copolymer unit.

10. A copolymer of isobutylene and the diester derived by esterifying tetrahydroabietyl alcohol with fumaric acid, said copolymer being linear in character and containing one molecule of the ester and one molecule of isobutylene per copolymer unit.

11. A copolymer of isobutylene and an ester derived by esterifying a hydroabietyl alcohol with maleic acid, said copolymer being linear in character and containing one molecule of the ester and one molecule of isobutylene per copolymer unit.

12. A copolymer of isobutylene and a diester derived by esterifying a hydroabietyl alcohol with maleic acid, said copolymer being linear in character and containing one molecule of the ester and one molecule of isobutylene per copolymer unit.

13. A copolymer of isobutylene and the diester derived by esterifying dihydroabietyl alcohol with maleic acid, said copolymer being linear in character and containing one molecule of the ester and one molecule of isobutylene per copolymer unit.

14. A copolymer of isobutylene and the diester derived by esterifying tetrahydroabietyl alcohol with maleic acid, said copolymer being linear in character and containing one molecule of the ester and one molecule of isobutylene per copolymer unit.

15. A process for the copolymerization of isobutylene with an ester derived by esterifying an abietyl alcohol with an $\alpha,\beta$-ethylenically unsaturated carboxylic acid which comprises contacting the monomers in the presence of a peroxide polymerization catalyst, said abietyl alcohol being a member of the group consisting of abietyl alcohol, dihydroabietyl alcohol, tetrahydroabietyl alcohol, dehydroabietyl alcohol, and mixtures of such alcohols.

GEORGE E. HULSE.

REFERENCES CITED

The following references are of record in the file of this patent:

UNITED STATES PATENTS

| Number | Name | Date |
|---|---|---|
| 2,130,740 | Humphrey | Sept. 20, 1938 |
| 2,142,989 | Barrett et al. | Jan. 10, 1939 |
| 2,182,316 | Hopff et al. | Dec. 5, 1939 |
| 2,384,595 | Blair | Sept. 11, 1945 |